United States Patent [19]

Kurzius

[11] 4,277,502

[45] * Jul. 7, 1981

[54] PREPARING YEAST RAISED BAKERY PRODUCTS WITH GLANDLESS COTTON-SEED

[76] Inventor: Karl A. Kurzius, 4246 Eubank, NE., Albuquerque, N. Mex. 87111

[*] Notice: The portion of the term of this patent subsequent to Oct. 10, 1995, has been disclaimed.

[21] Appl. No.: 100,889

[22] Filed: Dec. 6, 1979

[51] Int. Cl.$^3$ .............................................. A21D 2/36
[52] U.S. Cl. ...................................... 426/20; 426/21; 426/28; 426/507
[58] Field of Search .................................. 426/19–21, 426/28, 632, 629, 507

[56] References Cited

U.S. PATENT DOCUMENTS 4,119,731  10/1978  Kurzius ................................ 426/20

*Primary Examiner*—David M. Naff
*Assistant Examiner*—Elizabeth A. Hatcher
*Attorney, Agent, or Firm*—Richard A. Bachand

[57] ABSTRACT

Yeast raised bakery products, including bread, are made by combining glandless cotton-seed, including both its meal and oil factions, which has been cracked in a hammer-mill or the like. The cracked glandless cotton-seed is mixed with water, yeast, and flour and, optionally, salt, malt and other types of flour such as rye flour, whole-wheat flour, corn, flax-seed, oats, barley, soy-flour, triticale and rice and other coarse ingredients. If desired, a sour ingredient such as sour culture, lemon juice or other acids can be added. The combined ingredients are mixed, divided, and baked to produce a yeast raised bakery product of desired characteristics.

10 Claims, No Drawings

PREPARING YEAST RAISED BAKERY PRODUCTS WITH GLANDLESS COTTON-SEED

BACKGROUND OF THE INVENTION

As reported in the *Cotton Gin and Oil Mill Press,* Aug. 19, 1972, "New Food for the Protein-Hungry World" by Carol Hoffpauir, cotton-seed is being considered for use in food products, including bakery products. At present, there are two types of cotton-seed of interest, the first being the usual for normal cotton-seed of commerce, and the second being the glandless varieties of cotton-seed. The normal cotton-seed contain glands and gossypol, which is toxic to single stomached animals. The normal cotton-seed, therefore, is not suitable for human consumption without special processing for removal of the toxic gossypol. The glandless cotton-seed, on the other hand, does not contain toxic gossypol, and, therefore, can be used in human food stuffs.

In the treatment of normal cotton-seed, a process widely known as the Liquid Cyclone Process (LCP) can be used. The LCP process separates the cotton-seed into two parts, one being a finely divided high protein flour essentially free of gossypol, and the other containing pigment glands, coarse meat particles imbedded in the glands and some hull particles. The cotton-seed produced by the LCP process has most of the naturally occurring cotton-seed oil removed from it, and acts as an excellent emulsifier in recipes.

Since the LCP cotton-seed flour is fairly low in oil content, its use in bakery products, particularly breads and other yeast raised bakery products, in normally large quantities results in an extremely heavy product because of the absorption of the water and oil added to the recipe. Therefore, to avoid this heaviness attempts have been made to derive yeast raised bakery product recipes using only small quantities of the LCP cotton-seed flour. One of the principal advantages, however, derived from the cotton-seed flour is that it is particularly high in protein, thus, the trade off in the recipe is the level of protein (measured, for example, in grams of protein per ounce of bread product) in comparison to the lightness of the final bread product.

Despite the fact that glandless cotton-seed have been developed, typically the processes which have been employed to produce cotton-seed flour from the glandless variety of cotton-seed result in a flour from which the oil is removed. Thus, even the glandless defatted cotton-seed flour, when used in yeast raised bakery products, results in rather heavy, unpalatable bakery products.

In my patent application, Ser. No. 749,308, filed Dec. 10, 1976, I discussed a method for making yeast raised bakery products utilizing glandless cotton-seed directly. In this process, the glandless cotton-seed was added to the recipe without first having been reduced to flour. However, in order that the cotton-seed, in the final product be soft and, for that matter, an integral part of the final bread products, I found that it was necessary to soak the cotton-seed prior to adding them to the recipe. I found that the soaking of the cotton-seed, especially in the presence of a sour culture, opened the seed sufficiently to enable them to absorb moisture during the baking process so as not to become hard and incongruous in the soft bread texture.

BRIEF DESCRIPTION OF THE INVENTION

In light of the above, it is, therefore, an object of the invention to provide an improved method for making yeast raised bakery products from glandless cotton-seed, and product made therefrom.

It is another object of the invention to provide a method for making bread employing glandless cotton-seed which contain its natural meal and oil factions, and which produces a light, palatable, bread product.

It is another object of the invention to provide a recipe for producing yeast raised bakery products using glandless cotton-seed in which the previously required soaking steps have been reduced or eliminated without degrading the lightness of the final bakery product.

It is another object of the invention to provide a recipe for producing yeast raised bakery products, and in particular, bread, in which the requirement to add oil or shortening to the bread recipe has been eliminated.

It is another object of the invention to provide a recipe for producing yeast raised bakery products, and in particular, bread, in which the requirement to add oil or shortening to the bread recipe has been eliminated.

It is another object of the invention to provide a recipe for producing yeast raised bakery products including glandless cotton-seed which has the potential for producing a product having a high protein content which is lighter than the product formed from comparable amount of LCP cotton-seed flour.

These and other objects, features, and advantages will become apparent to those skilled in the art from the following detailed description when read in conjunction with the accompanying drawing and appended claims.

The invention, in its broad aspect, presents a process for making yeast raised bakery products, and the yeast raised bakery products made from the process. The process includes the steps of combining at least the following ingredients: cracked, glandless cotton-seed, including both its meal and its oil factions, water, salt, yeast, sour culture or other acidifiers and flour.

Then mixing the combined ingredients, dividing the mixed combined ingredients into portions for fermentation, proofing and baking of the portions. The bakery product which results therefrom is light, relatively high in protein, and requires no or little soaking of the cotton-seed, all as stated in the foregoing objects.

DETAILED DESCRIPTION OF THE PREFERRED EMBODIMENTS

In the production of yeast raised bakery products using glandless cotton-seed in accordance with the invention, the glandless cotton-seed is first prepared in the following manner. The whole glandless cotton-seed nut (kernel) is cracked in a hammer mill until it passes through a 1/16th inch screen. The cracked and screened cotton-seed are then used directly in the recipe, as below set forth. It should be noted that the cracked and screened cotton-seed, unlike cotton-seed flour produced in accordance with the LCP process above described, contain both their meal and oil factions. The oil faction of the cotton-seed, takes part in the baking recipe, making the addition of shortening or oil to the recipe unnecessary.

The cracking of the outer hull of the glandless cotton-seed kernel enables the cotton-seed kernel to absorb sufficient water during the processes in negotiating the recipe to thereby produce a final product in which the cotton-seed particles are not undesirably hard or objectionable. This breaking open of the cotton-seed hull was previously achieved by soaking the cotton-seed for a time sufficient to rupture the shell and, consequently, the previously required soaking step is unnecessary in the performance of the recipe in accordance with the present invention.

It should also be noted at this juncture that the screen size, although it has been stated to be 1/16th inch, is not critical, but is chosen merely to produce a final product in which the cotton-seed particles are of pleasant size for eating. Thus, the final size of the cotton-seed used in the recipe can be varied in accordance with individual taste, so long as the outer hull of the seed has been ruptured or cracked.

In the process for making yeast raised bakery products, and particularly bread or rolls, the following basic ingredients are mixed: water, glandless cotton-seed, including its meal and oil factions, cracked in accordance with the process described above, and salt, malt, yeast, sour culture, flour and other ingredients. A sour flavor, such as sour culture, lemon juice or the like can be added for flavor and also it helps to open the cracked cotton-seeds. In addition, various wheat types can be added, such as coarse wheat, rye, whole-wheat, and so on, for taste and texture. Finally, if adjustments to the protein content of the final product are desired, vital gluten can be added, as needed.

In a bread recipe the following ingredients can be used (naturally, the quantities of the ingredients can be adjusted according to taste):

| Per 100% mix or 442 lbs. total dough mix | | |
|---|---|---|
| | LBS. | % |
| Water | 176 | 38.82 |
| Cot-N-Nut | 40 | 9.15 |
| Vital Gluten | 23 | 5.31 |
| Whole Wheat | 10 | 2.40 |
| Coarse Wheat | 8 | 1.81 |
| Sour Culture | 6 | 1.46 |
| Yeast | 6 | 1.46 |
| Salt | 5 | 1.30 |
| Malt | 4 | 0.91 |
| Rye Flour | 4 | 0.91 |
| Bread Flour | 160 | 36.23 |
| | 442 | 100.00 |

It should be noted that because the oil faction in the cotton-seed has not been removed, it is not necessary to add shortening or oil to the recipe. Also, because of the sweet flavor of the cotton-seed kernels, no sugar need be added to the recipe.

The above ingredients are mixed in a bread mixer at a low speed for about two minutes and at a high speed (the time depending upon the type of special equipment in use) for about eight minutes. The mixing speed can be varied in a manner known in the art.

One criterion which can be used to determine the degree of doneness of the mixing is by monitoring the dough temperature. If the dough temperature is about 75° F. upon beginning the mixing process, it can be considered complete when the dough temperature reaches about 80° to 95°. This can be achieved in approximately 2–10 minutes.

The dough, after mixing, can be taken to a make up bench and immediately divided without floor time. It is then permitted to rise in proof or steam boxes for between thirty and sixty minutes. The dough is then baked in an oven, without steam, for about 32 minutes at an oven temperature of about 400° F.

The product made in accordance with the above process is a yeast raised product, bread, biscuits or the like, and is very rich in protein. For example, when approximately eight pounds of cotton-nut seeds are used in the recipe, and the percentages of the other ingredients of the recipe adjusted accordingly, each ounce of bread has about five grams of protein. This is, as will be appreciated, a relatively rough estimate since depending upon the wetness or dryness of the particular growing season of cotton producing the glandless cotton-seed, the cotton-seed will have more or less protein. Thus, for assuring a consistent protein content, the amount of the vital gluten added to the recipe can be adjusted accordingly, as indicated above.

Although the invention has been described and illustrated with a certain degree of particularity, it should be noted that the present disclosure has been made by way of example only, and that numerous changes in the combination and quantity of the ingredients and slight variations in the various steps of the process can be resorted to by those skilled in the art without departing from the spirit and scope of the invention as hereinafter claimed.

What is claimed is:

1. The process for making yeast raised bakery products comprising:
   combining at least the following ingredients:
   cracked, glandless cotton-seed, including both its meal and its oil factions, water, salt, yeast, sour-culture and flour;
   mixing said ingredients for fermentation in straight or sponge dough;
   dividing the mixed combined ingredients into portions for baking;
   proofing said portions;
   and baking said proofed portions.

2. The process of claim 1 wherein said combining step further comprises adding coarse wheat, malt, dark rye flour and a sour flavor ingredient.

3. The process of claim 1 or 2 wherein said mixing step comprises mixing the combined ingredients for a time between about two and ten minutes.

4. The product made in accordance with claims 1 or 2.

5. The process for making bread comprising:
   combining the following ingredients:

| Per 100% mix or 442 lbs. total dough mix | | |
|---|---|---|
| | Lbs. | % |
| Water | 176 | 38.82 |
| Glandless Cotton-Seed | 40 | 9.15 |
| Vital Gluten | 23 | 5.31 |
| Whole Wheat | 10 | 2.40 |
| Coarse Wheat | 8 | 1.81 |
| Sour Culture | 6 | 1.46 |
| Yeast | 6 | 1.46 |
| Salt | 5 | 1.30 |
| Malt | 4 | 0.91 |
| Rye Flour | 4 | 0.91 |
| Bread Flour | 160 | 36.23 |
| | 422 | 100.00 | mixing said combined ingredients;
   dividing the mixed combined ingredients into portions for fermentation;
   proofing said portions, and baking said proofed portions.

6. The process of claim 5 when said mixing of said combined ingredients of about 75° F., and agitating said combined ingredients until the combined ingredients reach a temperature of about 80° to 95° F.

7. The process of claim 5 wherein said mixing step comprises mixing the combined ingredients for a time between about two and about ten minutes.

8. The process of claims 5, 6 or 7 wherein said baking step comprises locating the dough in an oven for about 32 minutes at a temperature of about 400° F.

9. The process of claim 5 or 6 wherein said proofing of said portions comprises allowing said portions to rise between thirty and sixty minutes.

10. The product made in accordance with the process of claim 5 or 6.

* * * * *